(No Model.)
G. S. LONG.
MACHINE BELTING.
No. 251,262. Patented Dec. 20, 1881.
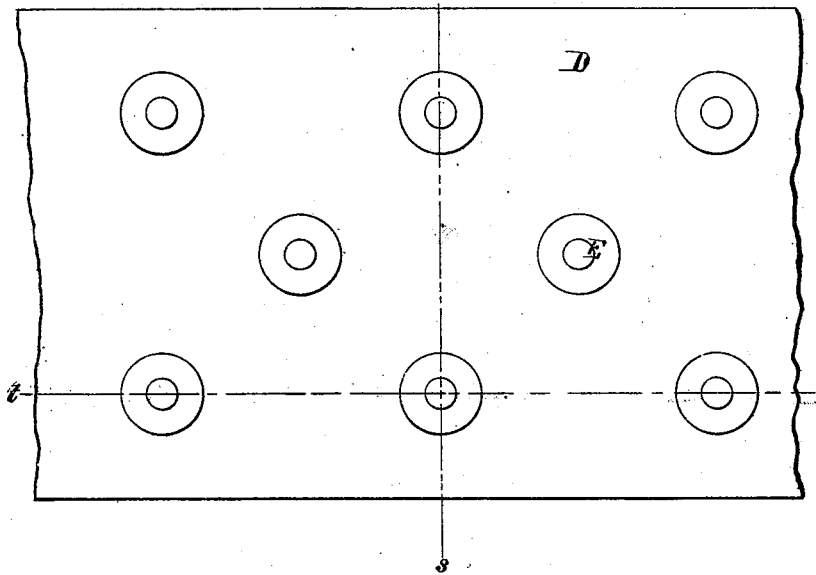
Witnesses
Aeland Boyle
Charles C. Stetson.
Inventor
George S. Long
by his attorney
Thomas L. Stetson

UNITED STATES PATENT OFFICE.

GEORGE S. LONG, OF HARTFORD, CONNECTICUT, ASSIGNOR TO THE AMERICAN WIRE BELT COMPANY, OF SAME PLACE.

MACHINE-BELTING.

SPECIFICATION forming part of Letters Patent No. 251,262, dated December 20, 1881.

Application filed May 25, 1881. (No model.)

*To all whom it may concern:*

Be it known that I, GEORGE S. LONG, of Hartford, in the State of Connecticut, have invented certain new and useful Improvements in Machine-Belting, of which the following is a specification.

I manufacture a belting of woven material of two or more plies, with longitudinal wires inserted centrally between the outer surfaces. On one or both faces of such belting I secure a separate piece of leather, or other suitable material possessing the desired qualities for adhesion to the pulleys, for communicating motion through the friction or traction thus induced. The facing material may be leather, rubber, or various compounds. The main qualities in the facing material are the required degree of softness and adhesion to the pulleys, the strength being mainly in the fabric.

The accompanying drawings form a part of this specification, and represent what I consider to be the best means of carrying out the invention.

Figure 1 is a view of a piece of completed belting. Fig. 2 is a section of the same on line *s s*, Fig. 1. Fig. 3 is a section on line *t t*, Fig. 1.

Similar letters of reference indicate corresponding parts in all the figures.

B is a fabric which may be, and preferably is, of fibrous yarn. I have represented the fabric as woven two-ply.

C represents longitudinal wires inclosed between the plies of the fabric. The whole may be saturated with india-rubber or other suitable filling material, the better to resist moisture and promote the durability of the construction.

D D represent leather made into practically continuous lengths by scarfing and splicing with cement or other ordinary or suitable means.

E E are rivets inserted through the leather and fabric, care being taken to open the holes through the latter by a pointed instrument, so as not to cut any of the wires. Suitable washers or clinchings being applied, the rivets are strongly headed and compressed so as to sink their ends flush with the outer surfaces of the leather D. The belt may be used for a long period without bringing the rivets into any serious contact with the pulleys.

Instead of placing the facing D on both sides, one side may be left uncovered. Such may be sufficient in many cases when the belt is certain to be used with only one face exposed to work.

Instead of leather, vulcanized rubber or a strong fabric saturated with vulcanized rubber or some of its compounds, or a composition of ground cork, paint oils, or analogous materials, may be used. It is only essential that the facing material be of a character to endure the wear and to afford a proper hold on the pulleys.

My improved belt differs substantially from those in which a composition is formed on the face of the material. It is not practicable to apply by any ordinary means such a thickness as I can apply by my method of forming the facing material separate and by a distinct process or mode of manufacture as may be required, and then attaching it by a separate operation. Stitching or other means of attachment may be employed instead of rivets.

I claim as my invention—

The longitudinal central wires, C, fabric body B, facing material D, and fastening means E, arranged and combined to form the improved belt, substantially as set forth.

In testimony whereof I have hereunto set my hand, at New York city, New York, this 30th day of April, 1881, in the presence of two subscribing witnesses.

G. S. LONG.

Witnesses:
M. F. BOYLE,
CHARLES C. STETSON.